Dec. 9, 1930.  W. M. PIGGOTT  1,784,027
AIRCRAFT CONSTRUCTION
Filed Nov. 9, 1929  3 Sheets-Sheet 1
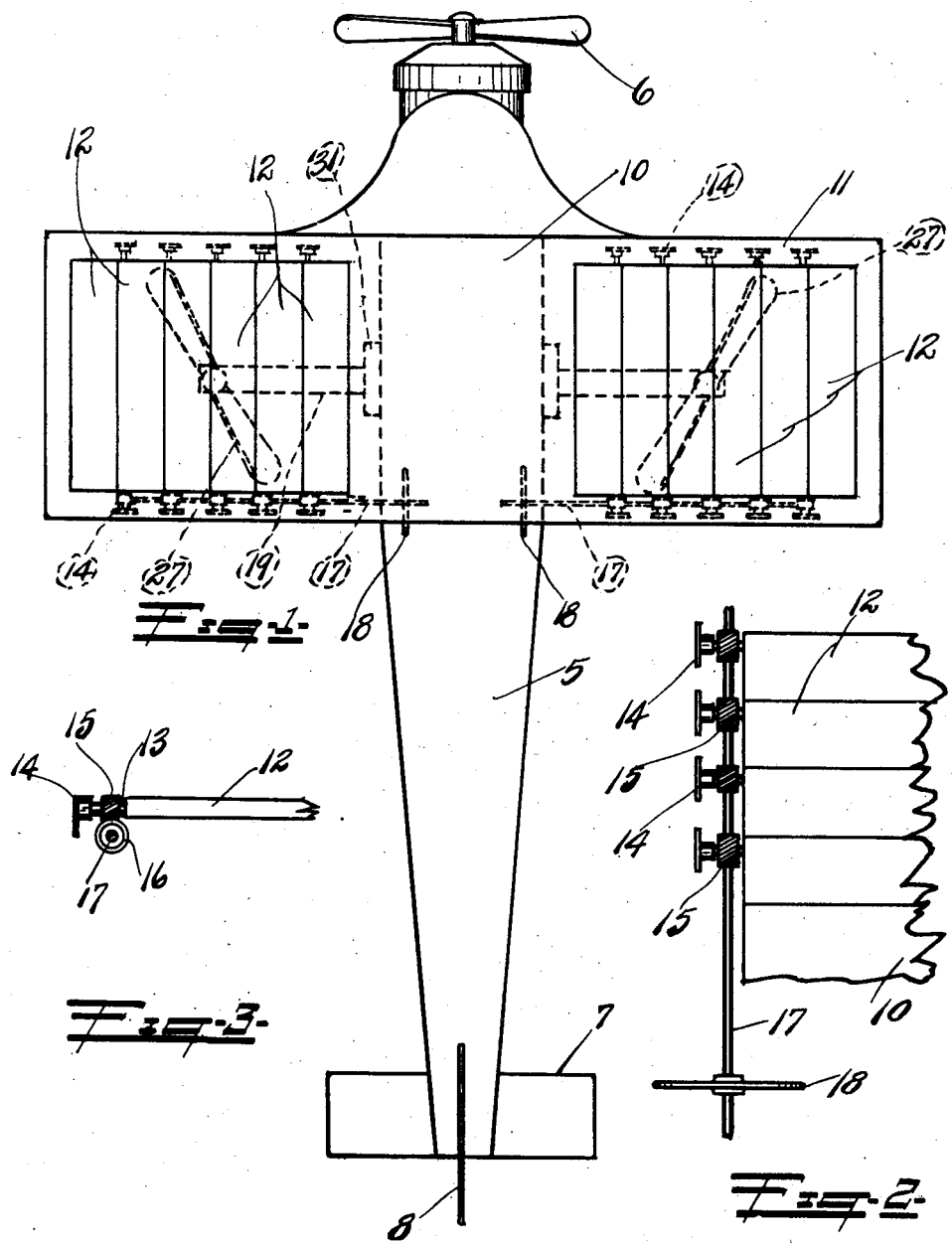
INVENTOR.
Warren M. Piggott.
BY
Frank C. Forman.
ATTORNEY.

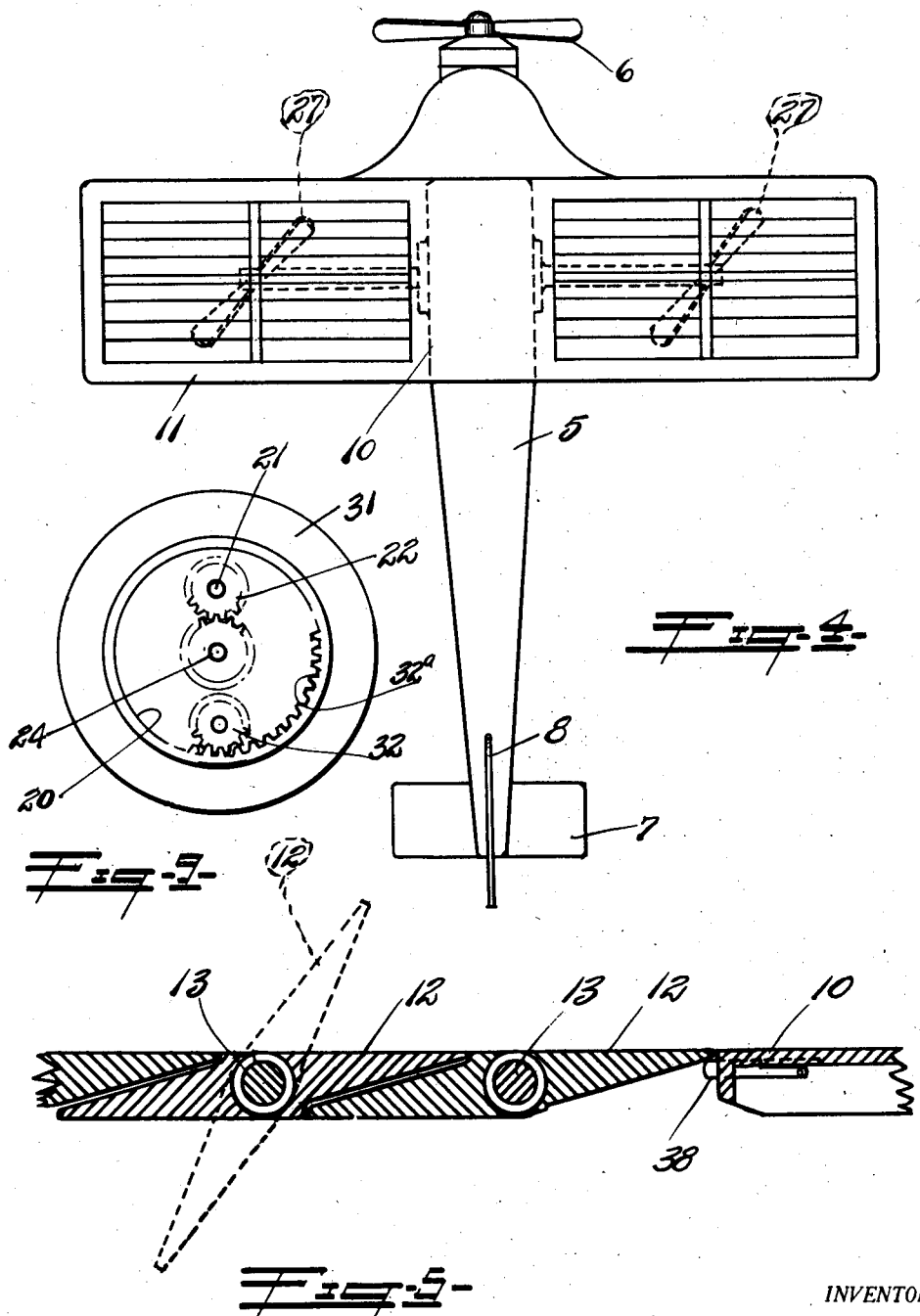

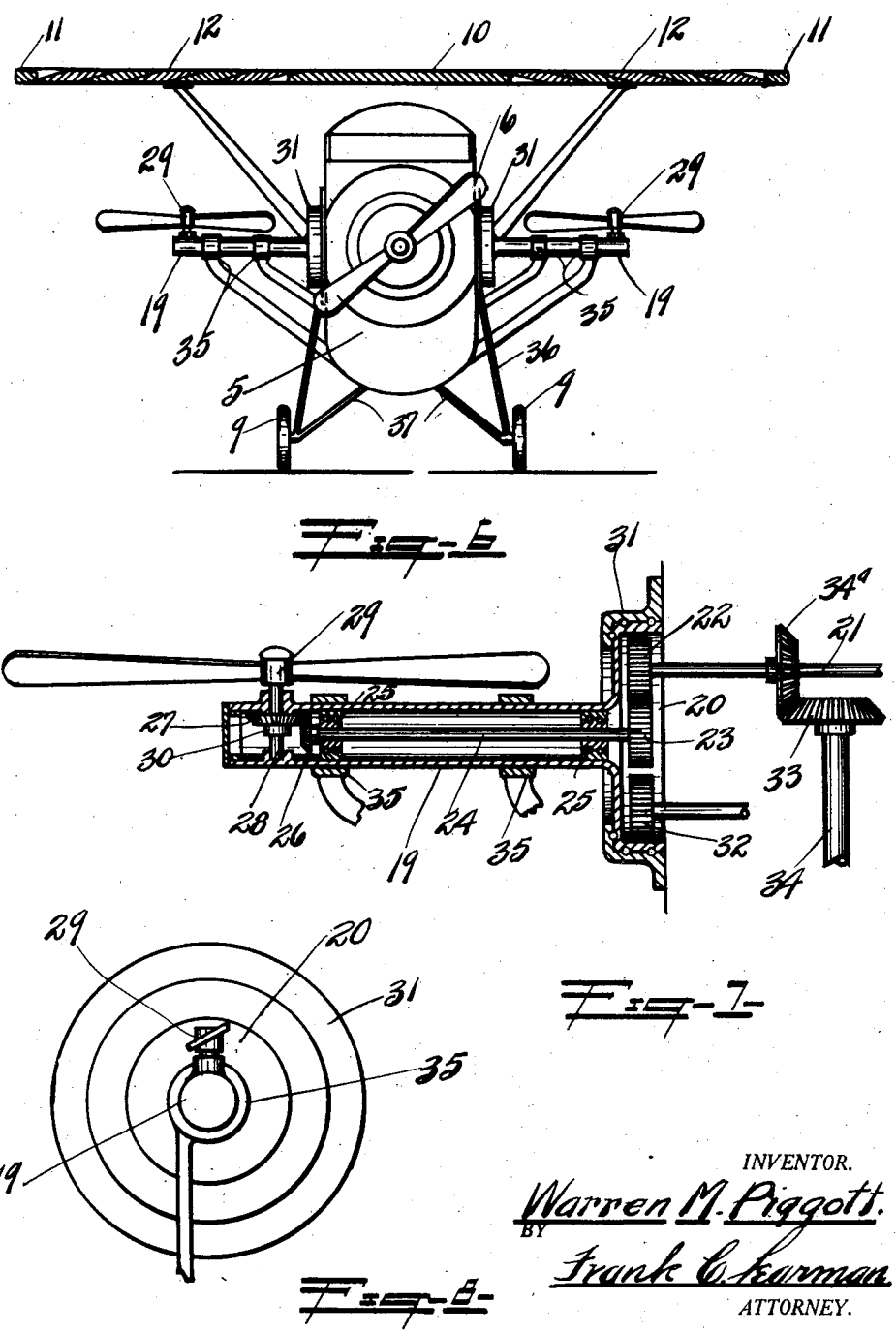

Patented Dec. 9, 1930

1,784,027

UNITED STATES PATENT OFFICE

WARREN M. PIGGOTT, OF BAY CITY, MICHIGAN, ASSIGNOR TO HATTIE A. PIGGOTT, OF BAY CITY, MICHIGAN

AIRCRAFT CONSTRUCTION

Application filed November 9, 1929. Serial No. 405,928.

This invention relates to aircraft construction, and more particularly to aircrafts designed to take off and land at low speeds, and in an almost vertical plane.

The prime object of the invention is to design an aircraft having a shutter wing construction, and which when set in a predetermined position, will present a very limited resistance to rising vertically from the ground.

A further object is to provide an aircraft having a shutter wing construction, as well as vertically disposed propeller members, for pulling the aircraft vertically, or permitting it to descend approximately vertically, thereby eliminating the taking off and landing at the high speeds, as is necessary with conventional aircraft at present in general use.

Another object is to design a simple and substantial means for controlling the shutters, together with means for shifting the propeller from vertical to horizontal position.

A still further object is to design a wing construction which can be actuated to regulate the elevation of the aircraft while in the air and which can be set in any desired direction.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing:

Fig. 1 is a top plan view of an aircraft showing my improved wing construction.

Fig. 2 is an enlarged fragmentary detail view of the wing illustrating the shutter operating means.

Fig. 3 is an edge view thereof.

Fig. 4 is a view similar to Fig. 1 showing the shutters disposed in a different plane.

Fig. 5 is an enlarged fragmentary sectional view of the wing.

Fig. 6 is a front view of the aircraft.

Fig 7 is an enlarged sectional view showing the side propeller driving machanism.

Fig 8 is an end view thereof.

Fig. 9 is a detail view of the gearing.

Referring now more particularly to the drawing, the numeral 5 indicates the fuselage of the aircraft, this is of the conventional design and is adapted to house a power plant (not shown), and on which a propeller 6 is mounted, the usual elevators and rudder 7 and 8 respectively being provided on the rear end of the fuselage, and ground engaging wheels 9 are provided on the under carriage, and serve to support the aircraft when it is not in the air.

Wings 10 are secured to the fuselage in the conventional manner, and it is to this wing construction and the side propellers that this invention is broadly directed.

This wing structure comprises an outer frame 11 in which a plurality of shutter members 12 are revolubly mounted, these shutters being pivotally connected to the main frame by means of stud shafts 13 which are secured to the ends of the shutters in any approved manner. The shutters can be made of any desired material, either solid or hollow, end bearings 14 being secured in the outer frame 11, and the end of the stud shafts 13 are revolubly journaled therein, a spiral gear 15 being mounted on each stud shaft, and is adapted to mesh with and be driven by a worm 16, which is mounted on a transversely disposed shaft 17, said shaft being journaled in conventional bearings, (not shown), and which are secured to the frame. Hand wheels 18 are provided on the shafts 17 directly above the pilot's seat in the fuselage, so that they can be readily manipulated as required to adjust the shutters to either open or closed position.

Sleeve members 19 project from the opposite sides of the fuselage, the inner ends terminating in an enlarged housing 20, a shaft 21 projecting into said housing, and a gear 22 is mounted thereon, meshing with and driving a spur gear 23 which is mounted on a shaft 24, said shaft being mounted in bearings 25 provided in the sleeve. A bevel gear 26 is provided on the outer end of the shaft 24 and meshes with a similar gear 27 which is secured on the shaft 28, a propeller 29 being mounted on the end of the shaft 28, and a collar 30 serves to hold the shaft in position.

An annular securing member 31 embraces the gear housing on the end of the sleeve, and is secured to the fuselage of the plane by means of bolts (not shown), said housing being rotatable through an angle of 90 degrees by means of a gear 32 which can be either hand or power actuated, said gear engaging a segment 32ª provided in said housing so that the propellers may be shifted to horizontal position when the aircraft has reached the desired altitude, and it is desired to travel straight ahead.

A differential is provided in the fuselage, and comprises a gear 33 secured to the drive shaft 34 of the power plant.

Spaced apart bearings 35 embrace the sleeve as shown, the ends being secured to the body of the fuselage as usual, and stays 36 and 37 respectively are also provided for bracing and securing the wheels in position.

In practice and when it is desired to take off, these side propellers 27 are in position as shown in Figs. 1, 4, and 6 of the drawings, and the shutters are in the open position, as shown by the dotted lines in Fig. 5, so that propellers may have a solid body of air in which to operate, and so that the aircraft may be raised vertically to the desired altitude, suitable clutch mechanism, (not shown) is then actuated to rotate the main propeller 6, and the sleeves 19 are rotated so that the side propellers 27 are disposed in the same plane as the main propeller, and assist in driving the air craft ahead.

When leading the side propellers are again shifted to vertical position, the shutters opened and the craft can be landed in a minimum of ground space, and at a very slow speed. It will of course be obvious that the side propellers may be omitted if desired and in no manner affects the operation of the shutters.

In Fig. 4 of the drawing, I have shown the shutters disposed in an opposite plane to those shown in Fig. 1, in this construction the shutters are mounted in units, and each unit can be tilted to any desired angle to come into a landing field as desired. A stop 38 is mounted on the center portion of the wing structure and limits the travel of the shutters, and by drawing said stop inwardly the shutters can be freely revolved.

From the foregoing description, it will be obvious that I have perfected a very simple, substantial, and practical wing construction and arrangement for airplanes.

What I claim is:—

1. An aircraft provided with a wing structure including a frame, a solid center section, the end sections comprising a plurality of shutter members revolubly and adjustably mounted therein, the edges of each panel being angled to nest on and fit the angled edge of the adjacent panel, so that a smooth wing surface is presented when the shutters are in closed position, propellers below said shutters and shiftable to either a vertical or horizontal position and slidable stops on the center section for holding said shutter members in horizontal position.

2. An aircraft provided with a wing structure including a frame, a solid center section, the end sections comprising a plurality of shutter members revolubly mounted therein in overlapping relation, the edges of each panel being angled to fit and nest with the edges of the adjacent panels, propellers below said shutters and shiftable to vertical and horizontal positions, means for simultaneously adjusting said shutter members, said means including a shaft having a plurality of worms mounted thereon and adapted to engage worm wheels mounted on the individual shutters, and stops for holding said shutters in horizontal position.

In testimony whereof I hereunto affix my signature.

WARREN M. PIGGOTT.